(12) United States Patent
Waris

(10) Patent No.: US 8,145,917 B2
(45) Date of Patent: Mar. 27, 2012

(54) SECURITY BOOTSTRAPPING FOR DISTRIBUTED ARCHITECTURE DEVICES

(75) Inventor: Heikki Waris, Helsinski (FI)

(73) Assignee: Nokia Corporation, Espoo (FI)

( * ) Notice: Subject to any disclaimer, the term of this patent is extended or adjusted under 35 U.S.C. 154(b) by 987 days.

(21) Appl. No.: 11/647,583

(22) Filed: Dec. 29, 2006

(65) Prior Publication Data

US 2007/0179907 A1     Aug. 2, 2007

Related U.S. Application Data

(60) Provisional application No. 60/754,639, filed on Dec. 30, 2005.

(51) Int. Cl.
   *G06F 21/00*     (2006.01)
(52) U.S. Cl. ....................................... 713/187
(58) Field of Classification Search .................... 713/187
   See application file for complete search history.

(56) References Cited

U.S. PATENT DOCUMENTS

| | | | |
|---|---|---|---|
| 5,453,979 A * | 9/1995 | Schibler et al. | 370/395.32 |
| 6,178,412 B1 * | 1/2001 | Ratzenberger et al. | 705/408 |
| 6,212,635 B1 * | 4/2001 | Reardon | 713/165 |
| 7,197,638 B1 * | 3/2007 | Grawrock et al. | 713/165 |
| 2002/0023223 A1 * | 2/2002 | Schmidt et al. | 713/187 |
| 2003/0091030 A1 * | 5/2003 | Yegin et al. | 370/352 |
| 2003/0140227 A1 * | 7/2003 | Asano et al. | 713/157 |

* cited by examiner

*Primary Examiner* — Benjamin Lanier
*Assistant Examiner* — Cordelia Zecher
(74) *Attorney, Agent, or Firm* — Mintz, Levin, Cohn, Ferris, Glovsky & Popeo, P.C.

(57) ABSTRACT

Securing the boot phase of a computing system implemented as a distributed architecture device can be performed by a system or method that uses hash functions and public key infrastructure (PKI) to verify the authenticity of modular subsystems. The modular subsystems can verify each other's authenticity, and can prevent unauthorized components from being inserted into the system when the system is without power.

21 Claims, 15 Drawing Sheets

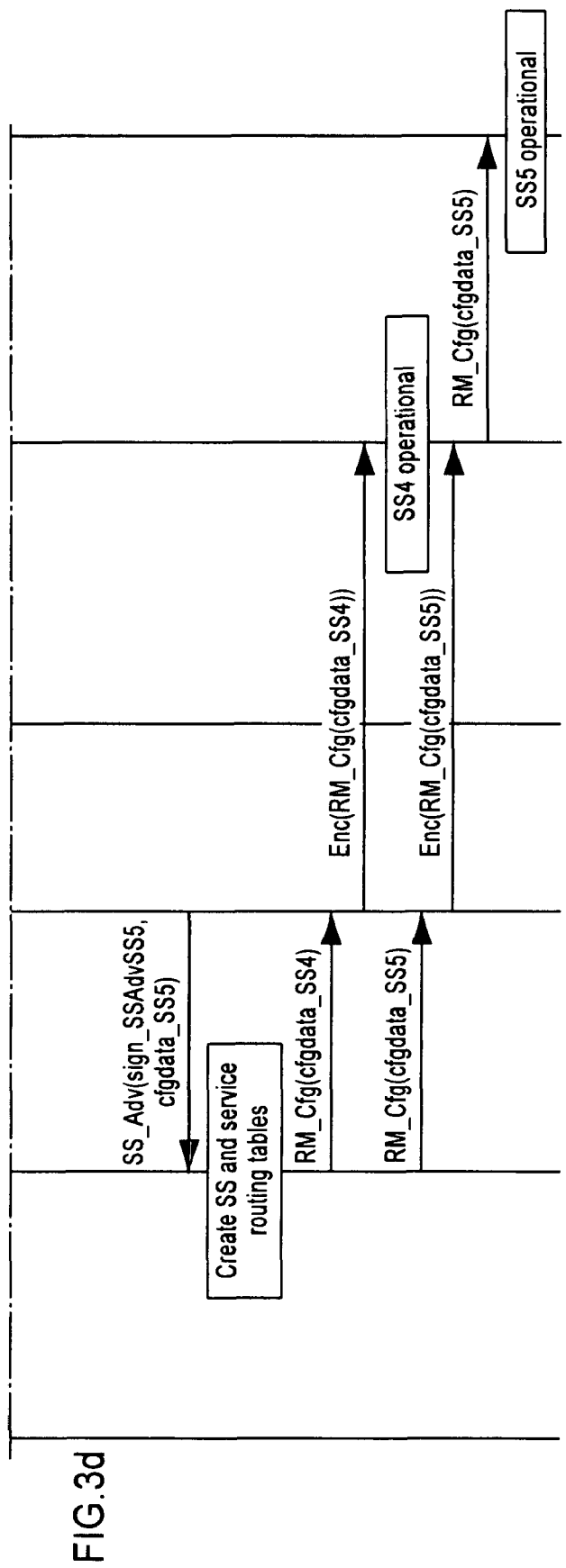

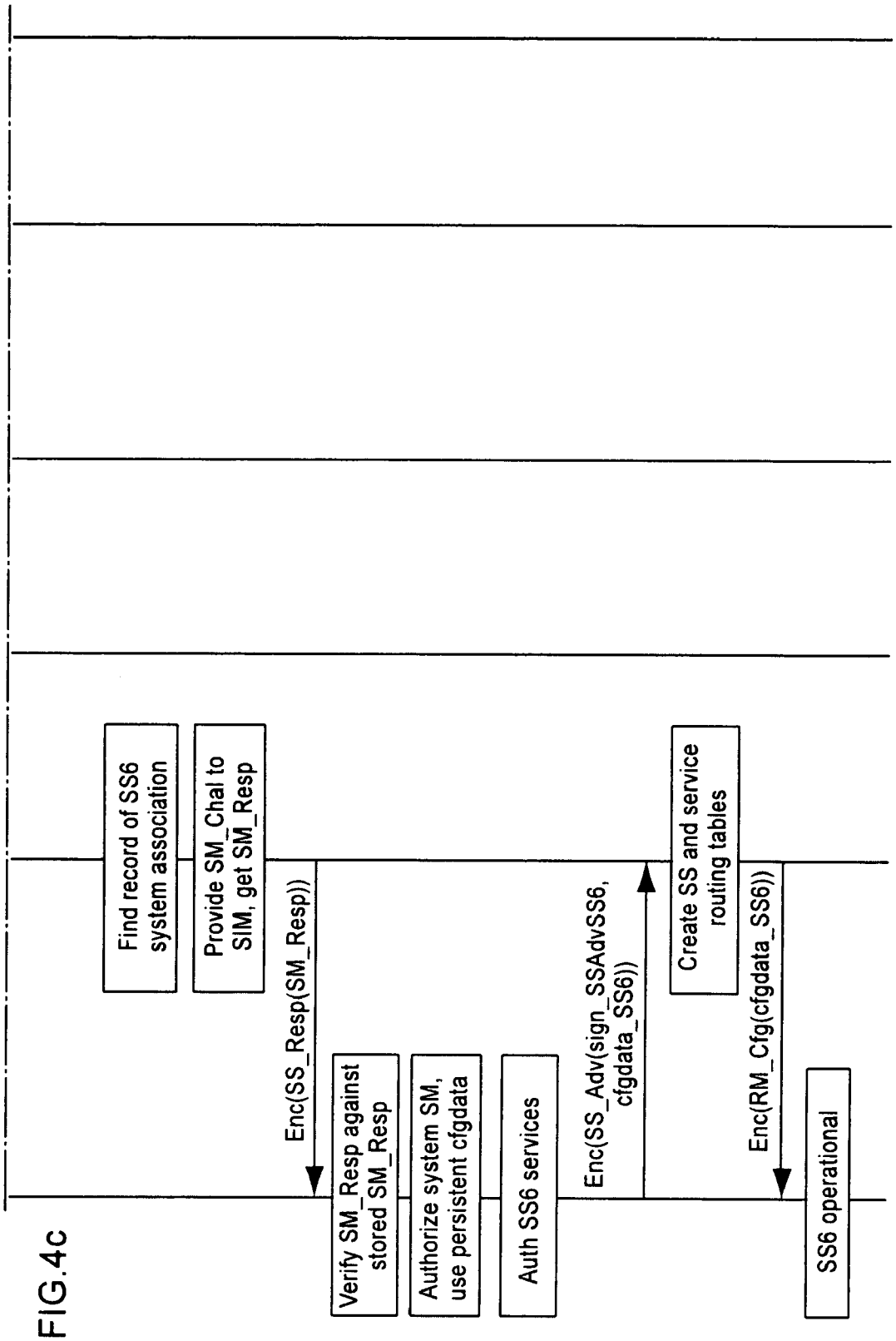

US 8,145,917 B2

SECURITY BOOTSTRAPPING FOR DISTRIBUTED ARCHITECTURE DEVICES

CROSS-REFERENCE TO RELATED APPLICATIONS

This Application is based on the U.S. Provisional Application Ser. No. 60/754,639, filed Dec. 30, 2005. The subject matter of the previously filed application is hereby incorporated by reference.

FIELD OF THE INVENTION

The present invention relates to a method and apparatus for securing the boot phase of a computing system implemented as a distributed architecture device.

BACKGROUND OF THE INVENTION

The need for flexibility and faster development times have raised interest in distributed computing systems. Distributed systems are based on two or more subsystems that have a well-defined role, commonly agreed interfaces towards other subsystems and can, in principle, be replaced with another implementation of the same subsystem. The corresponding high-level description of the system, architecture, describes these aspects of the distributed system.

There exist a number of reasons for moving towards distributed computing systems, for example, the emergence of multi-part products. It should be noted, however, that a distributed system does not need to be multi-part in a physical sense. Another reason for moving towards distributed computing systems is the need to comply with various standards (formal or de facto) that are based on well-defined subsystems and interfaces. Finally, interoperability between different vendors and possibility to use e.g. third party accessories are promoting the emergence of distributed architectures.

Distributed computing, however, has one clear disadvantage when compared to a monolithic system, namely security. Accessing the internals of a physically monolithic product can be difficult. Compromising a monolithic system, thus, is difficult because an attacker cannot easily access data or communication on a die or the proprietary interfaces between application specific integrated circuits (ASICs) inside the system chassis.

A system implementing a product, whether it is monolithic or distributed, can have three major phases of operation: boot, normal operation, and shutdown. Boot phase can prepare and initialize the system. Normal operation phase in a distributed system can start when the distributed executables are authorized and able to communicate with each other. It is essential to secure the boot phase so that secure system operation can be ensured during the subsequent phases.

The modern security bootstrapping architecture in monolithic systems typically contains trusted hardware services, including boot protection and secure execution. Secure execution performs cryptographic algorithms, random number generation and system monitoring. Furthermore, such monolithic systems contain secure storage for software certificates and perform integrity checks and authorization of software. The certificates are typically hashes of software, protected with public key cryptography. The permanently stored device vendor certificate is the root of trust chain for the identified device. The trust chain consists of certificates that are verified using higher level certificates, and ultimately root certificates.

For example, bootstrapping of a monolithic architecture device was based on a phased initialization starting with the trusted computing base and continuing with the verification of integrity in subsequently activated, less secure layer of hardware or software.

Use of public key infrastructure for keys or certificates that form the chain of trust in the phased initialization of the monolithic device is another technique that is used. Finally, centralized key distribution mechanisms, where one trusted node brokers the establishment of mutual trust between other nodes is another technique that is used.

However, techniques for securing monolithic devices are not effective to secure distributed devices, and accordingly, there is a need, for example, to secure the boot phase of a computing system implemented as a distributed architecture device.

SUMMARY OF THE INVENTION

The present invention provides, for example, a method for securing a modular device including providing a public key infrastructure (PKI) key to a plurality of subsystems of a modular device, providing a hashing mechanism to the plurality of subsystems of the modular device, and verifying the authenticity of the plurality of subsystems by one another during boot-up using the key and hashing mechanism.

The present invention also provides, for example, a secure modular device including a management module and a non-management module. The management module and the non-management module comprise a public key infrastructure (PKI) key and a hashing mechanism. The management module and the non-management module are configured to verify one another's authenticity.

The present invention further provides, for example, a secure modular device including a connectivity subsystem, an application subsystem connected to the connectivity subsystem, an internal storage subsystem connected to the application subsystem, an external storage subsystem connected to the connectivity subsystem. an imaging subsystem connected to the application subsystem, and an input subsystem connected to the imaging subsystem. The application subsystem, the internal storage subsystem, the external storage subsystem, the imaging subsystem, and the input subsystem comprise a link controller, a security controller, a resource controller, a power controller, and a network gateway. The connectivity subsystem comprises a link controller, a security manager, a resource manager, a power manager, and a network gateway. The application subsystem, the internal storage subsystem, the external storage subsystem, the imaging subsystem, and the input subsystem are configured to mutually authenticate with the connectivity subsystem.

The present invention additionally provides, for example, a method of authenticating subsystems in a secure device. The method includes identifying whether links to a subsystem are trusted or untrusted, calculating a first hash of the subsystem's software, calculating a second hash from a certificate plus a public key, comparing the first hash and the second hash, and if the hash indicates that the software and certificate are authentic, and authorizing the software and certificate. The method also includes authenticating other subsystems by providing a signed security manager advertisement message (SM_Adv), awaiting a responsive subsystem challenge message (SS_Chal), providing a subsystem response message (SS_Resp) in response to the SS_Chal, awaiting an appropriately signed subsystem advertisement message (SS_Adv), and providing resource manager configuration information (RM_Cfg) to the other subsystems.

The present invention also provides, for example, a method of securing a modular system. The method includes providing by a manufacturer or vendor a central control authority for the system, the system including subsystems. The method also includes configuring a first portion of the system such that a first group of subsystems containing non critical services are connected over vulnerable links to a second portion of the system with the central control authority and a second group of subsystems containing critical services. The method further includes providing subsystems with secure access to public key cryptographic functions. The method additionally includes storing in a plurality of the subsystem a set of unique identity information that is configured to be verified using public key infrastructure (PKI) based certificates.

The present invention further provides, for example, a method of securing a modular system. The method includes performing a configuration check of a plurality of subsystems including a management subsystem and a non-management subsystem, authorizing trusted peer subsystems, advertising the management subsystem, establishing connections between subsystems over untrusted links, exchanging initial configuration information between the management subsystem and the non-management subsystem, authorizing service software in the management subsystem and the non-management subsystem, and creating and distributing system routing tables with the management subsystem.

The present invention additionally provides, for example, a secure modular device including a first module means for management functions in the device and a second module means for non-management functions in the device. The first module means and the second module means comprise a public key infrastructure (PKI) key and a hashing mechanism. The first module mans and the second module means are configured to verify one another's authenticity.

The present invention also provides, for example, a secure modular device. The device includes a first subsystem means for connectivity functions, a second subsystem means for application functions connected to the first subsystem means, a third subsystem means for internal storage functions connected to the second subsystem means, a fourth subsystem means for external storage functions connected to the first subsystem means, a fifth subsystem means for imaging functions connected to the second subsystem means, and a sixth subsystem means for input functions connected to the fifth subsystem means. The second subsystem means, the third subsystem means, the fourth subsystem means, the fifth subsystem means, and the sixth subsystem means comprise a link controller, a security controller, a resource controller, a power controller, and a network gateway. The first subsystem means comprises a link controller, a security manager, a resource manager, a power manager, and a network gateway. The second subsystem means, the third subsystem means, the fourth subsystem means, the fifth subsystem means, and the sixth subsystem means are configured to mutually authenticate with the first subsystem means.

BRIEF DESCRIPTION OF THE DRAWINGS

In the following, the present invention will be described in greater detail based on a preferred embodiment with reference to the accompanying drawings in which.

DESCRIPTION OF THE PREFERRED EMBODIMENTS

Figure 1:
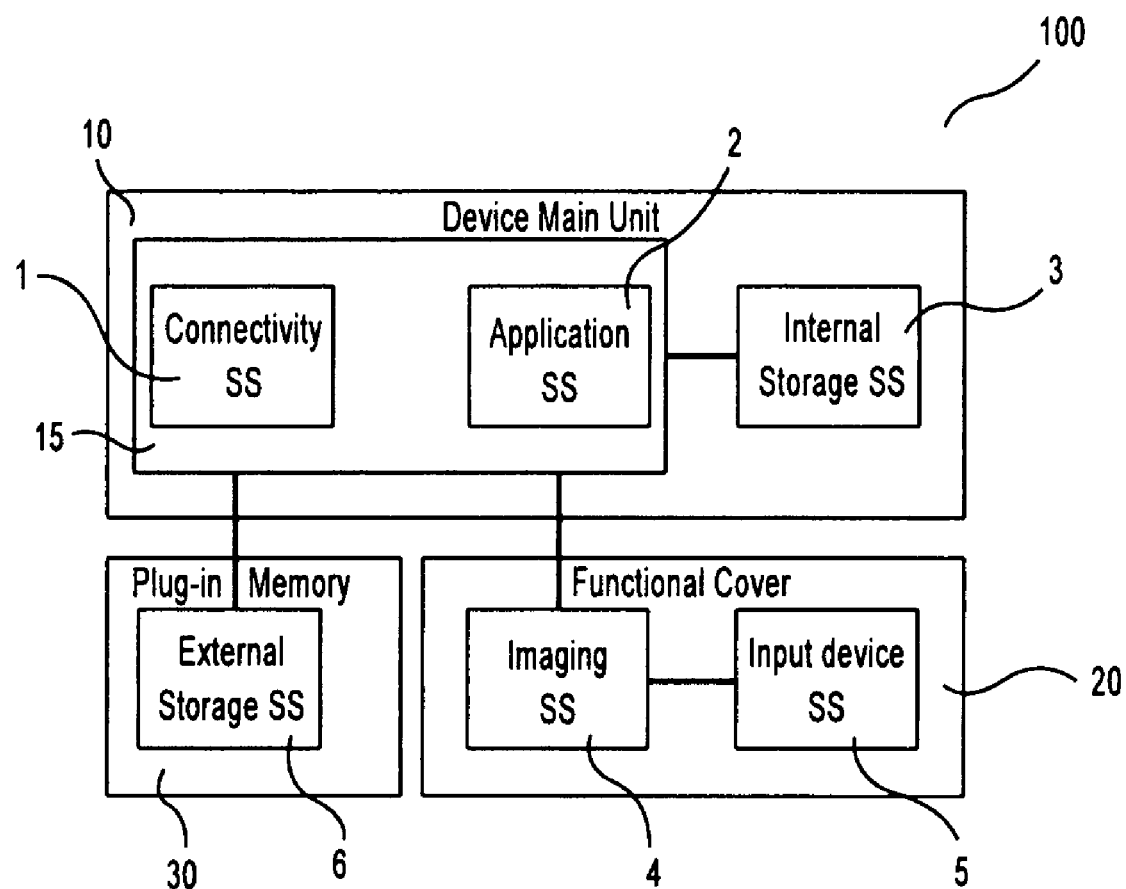
FIG. 1 depicts a high level diagram of the interconnections in an example distributed device.

An embodiment of the invention will now be described with regard to an example embodiment that includes a device main unit, a plug-in memory, and a functional cover. Such particular sub-systems are presented by way of illustration, and the invention is not limited to the particular subsystems described.

As described above, monolithic systems can be assumed to have strictly integrated components connected with proprietary interfaces, with difficult access or hot-plugging of components, and difficult access to data or communication on a die or on proprietary interfaces between ASICs inside the system enclosure by an attacker. These assumptions are not valid for distributed systems.

Some threats for distributed systems include: compromise by malicious logic of a part of the system between boots, for example, virus received during operation that modifies SW in the subsystem (SS) network stack; messaging overload in/between subsystems, for example, reporting failure state in one subsystem to another subsystem that leads to subsequent and consequential report messages that accumulate and consume link capacity, which can be caused by genuine or bogus messages; system power overload caused by genuine or bogus subsystem power consumption, for example, a malicious subsystem that draws power from a common device power source and just produces heat, thus denying that power to the other subsystems; resource consumption overload in a critical or bottleneck subsystem, for example, a malicious subsystem that sends bogus encrypted messages to another subsystem where decryption consumes crypto processing power and denies other services; genuine or bogus subsystem/service configuration, which may be obsolete or incorrectly created, for example, an subsystem that sends configuration to previously authorized but later compromised subsystem; inability by subsystem to possess or verify a complete certificate chain, or establish a security association, for example, an subsystem that has no certificate in initial secure storage for verifying the root of a certificate chain provided by a peer subsystem, preventing attestation; exposure of system messaging over insecure inter-subsystem links or in subsystem parts, for example, a device that uses weak encryption on wireless link for performance reasons; and system configuration/authorization based on incorrect administrative domain, for example, a subsystem for use in enterprise network that is reconfigured in a personal user device.

Certain embodiments of the present invention, which will be described in more detail below, may mitigate the above and other threats by the following techniques: implicit derivation of trust from secure system assembly and configuration; use of certificates for authorizing subsystems and their software, and receiving such certificates along with each update from external sources; aggregation and resolution of all system wide configuration in a central control entity, which is the only authoritative source for that data for the subsystems; detection and access control of subsystem links on the physical layer taking into account secure initial system topology configuration; very strictly controlled use of state information across boots, for example, operating with only soft state after system boot; and encryption of critical traffic over insecure links.

As shown in FIG. 1, a node 100 may include a device main unit 10, a functional cover 20, and a plug-in memory 30. The node may include a system core integrated circuit 15 and an internal storage sub-system (SS) 3. The system core integrated circuit 15 may include a connectivity subsystem 1 and an application subsystem 2. The functional cover 20 may include an imaging subsystem 4 and an input device subsystem 5. The plug-in memory 30 may include an external storage subsystem 6. As described herein, "external" is with reference to the device main unit 10, but may be internal to the plug-in memory 30.

The node may be configured to function by the use of security controllers, resources controllers, resource managers, and network gateways. The security controller can be the minimal trusted base hardware implementation. It can perform software integrity checks, authorizations, and control the boot process. The resource controller can address threats involving consumption of resources. This subsystem can be managed, and may be present in all subsystems.

A resource manager can be the central authority to control system configuration. It may serve as the system wide policy decision point (PDP) to control subsystem level policy enforcement points (PEP). Resource managers and other managers may be included in the master subsystem.

A network gateway can serve as an interface for system and service messaging. It may provide generic subsystem and service connectivity to all subsystems.

It is important to understand the distinction between a security controller (SC) and a security Manager (SM), both of which can serve as a trusted base for a subsystem. The SC can include: secure storage, platform and SW certificates hash and random functions, symmetric key crypto in most subsystems, public key crypto in most subsystems, authorization functions for messages and software, confidentiality crypto functions in some subsystems, boot message protocol, and link specific secure/non-secure configuration registry.

In contrast, a security manager can include: reception and authorization of subsystem networking advertisements, creation and sending of routing table and network access control policies, reception and authorization of subsystem service advertisements, creation and sending of service table and service access control policies, authentication and key agreement with a non-secure boundary subsystem, and transmission of session keys to a secure peer subsystem of a non-secure boundary subsystem.

An example of the distributed architecture that can be protected by certain embodiments of the present invention is one in which services are provided by intelligent subsystems.

Similarly, it may be valuable to recognize the distinctions between a link controller (LC), which may be a trusted base, and a network gateway (NG), which may be system control software. An LC can address: the physical, link and lower network layers; interconnect physical state detection and activation; peer link state detection and activation; boot message forwarding; message I/O for SC; and message collision detection and retransmission.

In contrast, the NG can address: the physical, link and upper network layers; message forwarding based on routing table received from RM; message I/O with LC; message buffering; upper network and service layers; registration and authorization related messaging; message forwarding based on service table received from RM; and message I/O for the correct registered service.

The resource and power controllers and managers can be system control software. The resource controller (RC) can deal with inter-service or inter-process scheduling; memory allocation to services or processes; reception and forwarding of service specific QoS, memory, CPU, and the like requirements; and reception and enforcement of RM service resource reservations. The resource manager can deal with reception and aggregation of service specific requirements; resolution and sending of service resource reservations to subsystems; and resolution and sending of service power allocations to PM.

The power controller can deal with reporting of subsystem power state to PM and enforcing PM decisions. In contrast, the power manager can deal with receiving power state reports from PC and forwarding service power allocations from RM to PC.

The subsystems can be semi-capable and intelligent, and can provide services for the system or device. They can be interconnected with secure or insecure links, and can be connected outside the device main unit.

An embodiment of the invention allows nodes or subsystems (SS) to establish secure connectivity to other nodes over secure links or interconnects and secure association with a trusted centralized management node or resource manager (RM).

Before the distributed system is booted, at least those components to be booted must be manufactured and, to some degree, assembled. Accordingly, a system vendor can secure the manufacturing and assembly facilities, and securely store certain unmodifiable configuration information specific to the system or subsystem at the time of assembly, after verification of the components and before the system is sent to the markets and end users. This information can permit subsystems to know the security level of their immediate system neighborhood and measure their behavior during the boot phase.

A trusted computing and networking base in each node of a distributed architecture device can be used in an embodiment of the invention, and initial secure connectivity between these nodes can be established based on secure configuration information installed in each node during initial assembly of the nodes. The nodes can start from the secure initial configured state after power-up and get further authoritative configuration information from a trusted centralized management node. The nodes can be limited to use only soft states during operation, or additional initial configuration information that is authorized by the security domain and/or end user specific identity module such as an evolved SIM after establishing connectivity to the trusted centralized management node. Thus, certain embodiments of the present invention can help to protect nodes that are incapable of complex cryptographic operations. Certain embodiments can also support nodes that are connected to the system using insecure links.

In order to protect nodes that are incapable of complex cryptographic operations, that are susceptible to easy physical manipulation, or that are connected to a system using an insecure link, the boot phase of the computing system of a distributed architecture device can be secured.

A manufacturer or vendor can place a central control authority or element in the system and design the rest of the system so that only subsystems containing non-critical services are connected to the part with the central control authority over vulnerable links. The vendor or manufacturer can also ensure that such subsystems are able to access public key cryptographic functions securely.

The vendor or manufacturer can store in each subsystem a set of unique identity information that can be verified using public key infrastructure (PKI) based certificates.

Certain embodiments of the present invention relate to the various initial phases in the system boot, starting from the separate power-up of individual subsystems and ending at the point where all subsystems can securely exchange configuration messages with the central control element responsible for system-wide consistency of and trust in the configuration. These phases can be described as follows: power-up and link test, authorization of the system control software modules used during the boot phase, and establishing a secure connection to an authorized central control authority or element.

Each boot phase can build on trust in the preceding phases, and therefore the phases listed above should establish secure connectivity between subsystems, and deliver authorized system configuration for external subsystems. The boot process can then continue to establish connectivity among the services residing in the subsystems, after which the boot process ends and the system can start normal operation.

Accordingly, the following areas will not be discussed in detail: controlled exchange of subsystem level routing information between the subsystems and the central control authority; creation of a system routing table in the central control authority; authorization of service software modules; controlled exchange of service level routing information between the subsystems and the central control authority; and creation of a system service routing table in the central control authority.

Figure 2A:
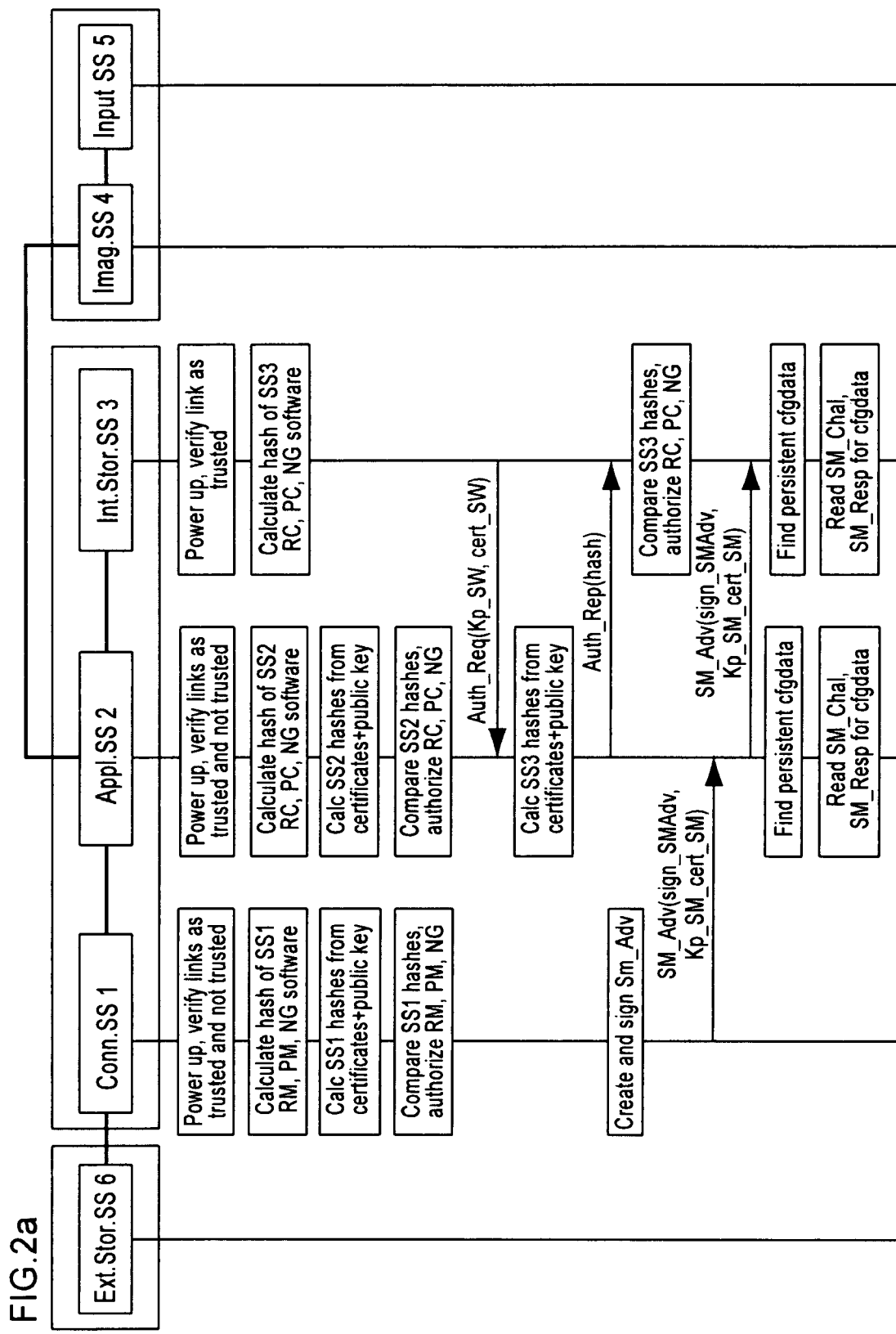
FIG. 2 depicts a communication schema during the boot phase of operation amongst the various sub-systems of an example distributed device.
Figure 2B:
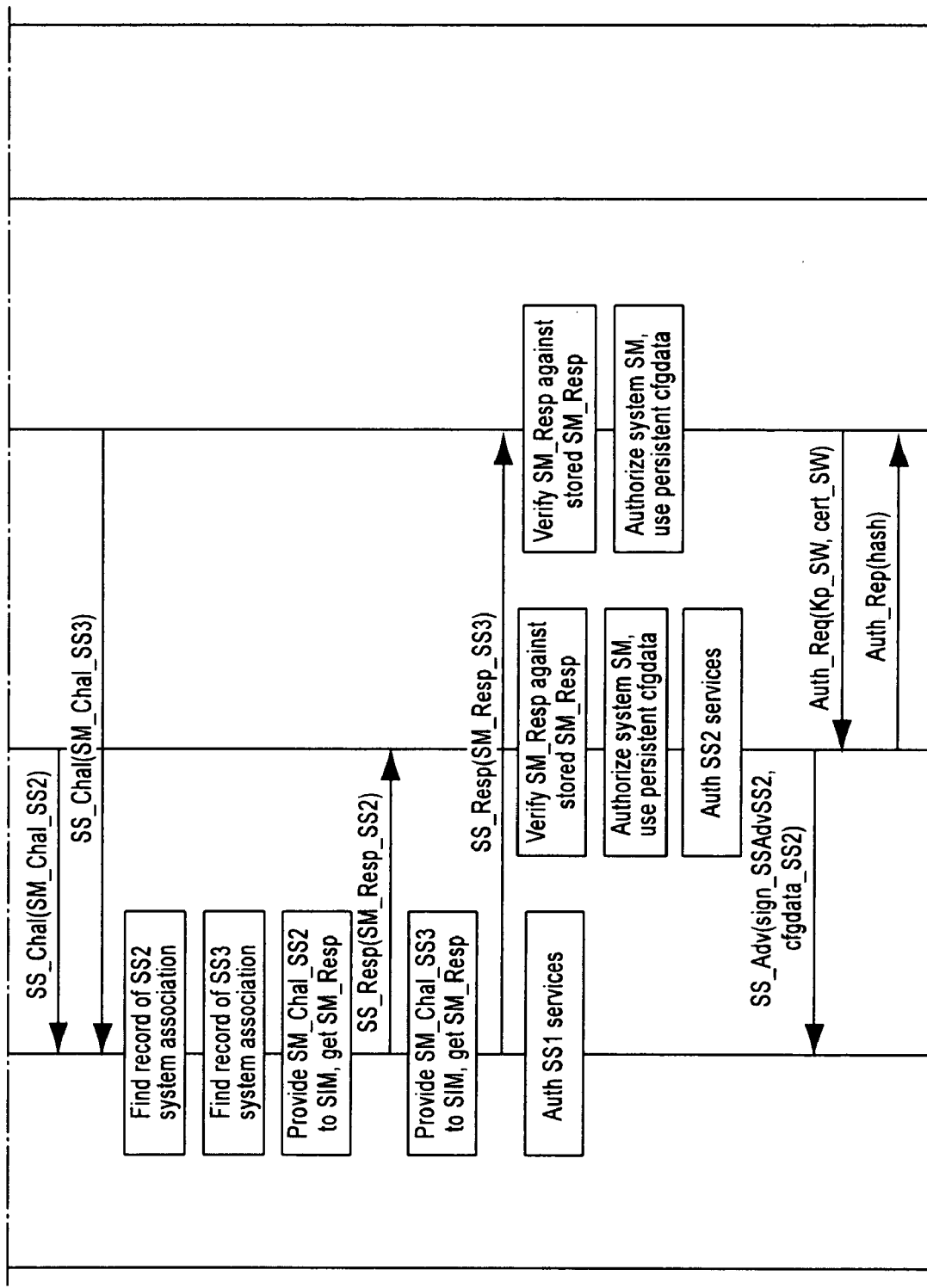
Figure 2C:
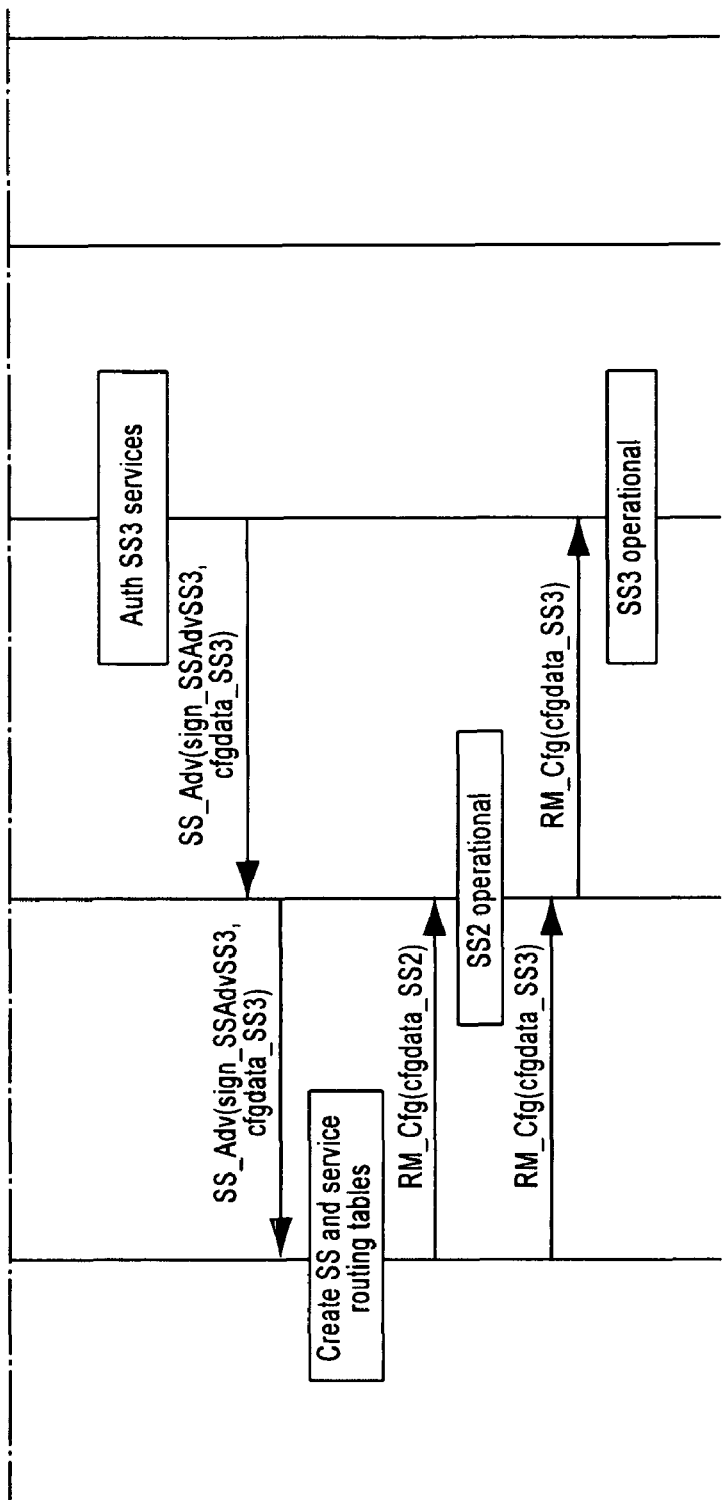

As shown in FIG. 2, the Connectivity Subsystem 1 can co-authenticate with the Application Subsystem 2 and the Internal Storage Subsystem 3. Each of the subsystems may first power up and then verify all existing links with other subsystems as either trusted or untrusted. Next, the subsystems may each calculate a hash of their software. The connectivity subsystem 1 may calculate the hash of its resource manager, power manager, and network gateway software. The Application Subsystem 2 and the Internal Storage Subsystem 3 may calculate the hashes of their respective resource controller, power controller, and network gateway software. Next, the Connectivity Subsystem 1 may calculate its own hashes from a certificate plus a public key, and Application Subsystem 2 may also calculate its own hashes from a certificate plus a public key.

Next, the Connectivity Subsystem 1 may compare its own calculated hashes with the hashes of the software and authorize its software, and Application Subsystem 2 may do the same with respect to its software. After that, the Internal Storage Subsystem 3 may send an authorization request to the Application Subsystem 2. The authorization request may include the software public key and software certificate for the Storage Subsystem's 3 software. The Application Subsystem 2 may calculate hashes from the certificates and public key. The Application Subsystem 2 may then send an authorization response, which may include the hashes. The Storage Subsystem 3 may then compare the hashes and, if they compare properly, authorize the software.

Meanwhile, the Connection Subsystem 1 may send a security manager (SM) advertisement message to the Application Subsystem 2, which may relay the SM advertisement message to the Internal Storage Subsystem 3. Then both the Application Subsystem 2 and the Internal Storage Subsystem 3 may find their own persistent configuration data, and read the SM challenge and response pair for the configuration data.

Next, the Application Subsystem 2 and the Internal Storage Subsystem 3 may each provide a subsystem (SS) challenge identifying the particular subsystem making the challenge to the Connection Subsystem 1.

The Connection Subsystem 1 then finds a record of Application Subsystem 2 and a record of Internal Storage Subsystem 3. The Connection Subsystem 1 can then provide the SM challenge message to its specific identity module (SIM) and receive from its SIM the appropriate SM response.

Then the Connection Subsystem 1 may provide a corresponding subsystem response to each of the subsystems. Subsequently, the Connection Subsystem 1 may authorize its own services.

Meanwhile, the Application Subsystem 2 can verify the SM response against the stored SM response. If the comparison is favorable, the Application Subsystem 2 can authorize the SM and use the persistent configuration data. The Application Subsystem 2 can also authorize its own services. The Application Subsystem 2 can then send an SS advertisement that is signed and contains configuration data.

While the Application Subsystem 2 is verifying the SM response, the Internal Storage Subsystem 3 can verify the SM response it received. If the comparison is favorable, the Internal Storage Subsystem 3 may authorize the system SM and use its persistent configuration data.

The Internal Storage Subsystem 3 may then send an authorization request containing its key plus its certificate to the Application Subsystem 2. The Application Subsystem 2 may respond with an authorization response including a hash. If the hash is as expected, the Internal Storage System 3 may authorize its services.

The Internal Storage Subsystem 3 may send an SS advertisement signed and containing configuration data to the Application Subsystem 2. The Application Subsystem 2 may forward the SS advertisement to the Connection Subsystem 1. The Connection Subsystem 1 can then create SS and service routing tables. The Connection Subsystem 1 can then send appropriate resource manager (RM) configuration data to the Application Subsystem 2, at which time the Application Subsystem 2 is fully operational. The Connection Subsystem 1 can then send appropriate RM configuration data to the Application Subsystem 2 for the Internal Storage Subsystem 3. The Application Subsystem 2 may then forward the RM configuration data to the Internal Storage Subsystem 3, at which time the Internal Storage Subsystem 3 may be fully operational.

Figure 3A:
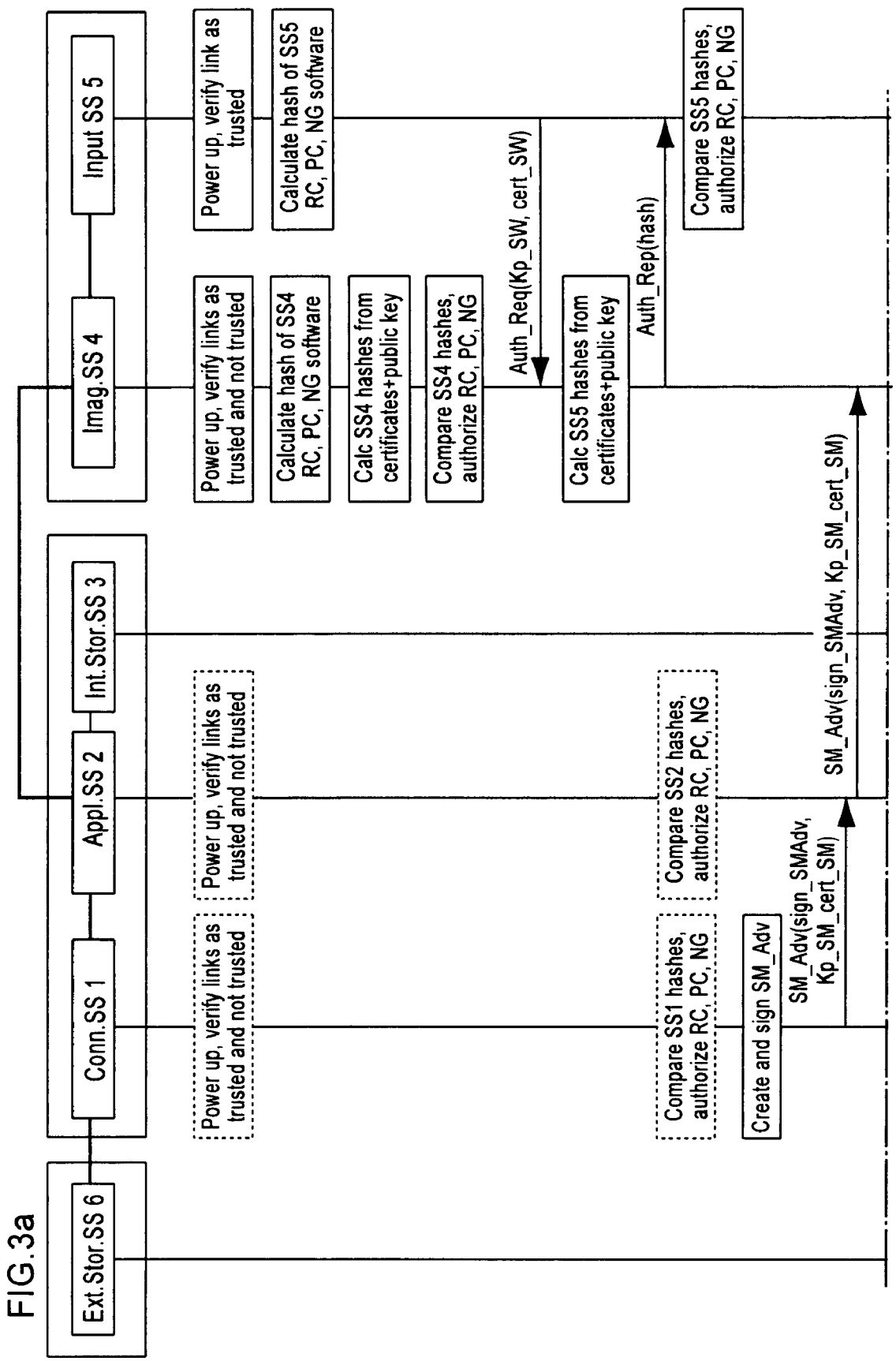
FIG. 3 depicts a communication schema during the boot phase of operation amongst the various sub-systems of an example distributed device.
Figure 3B:
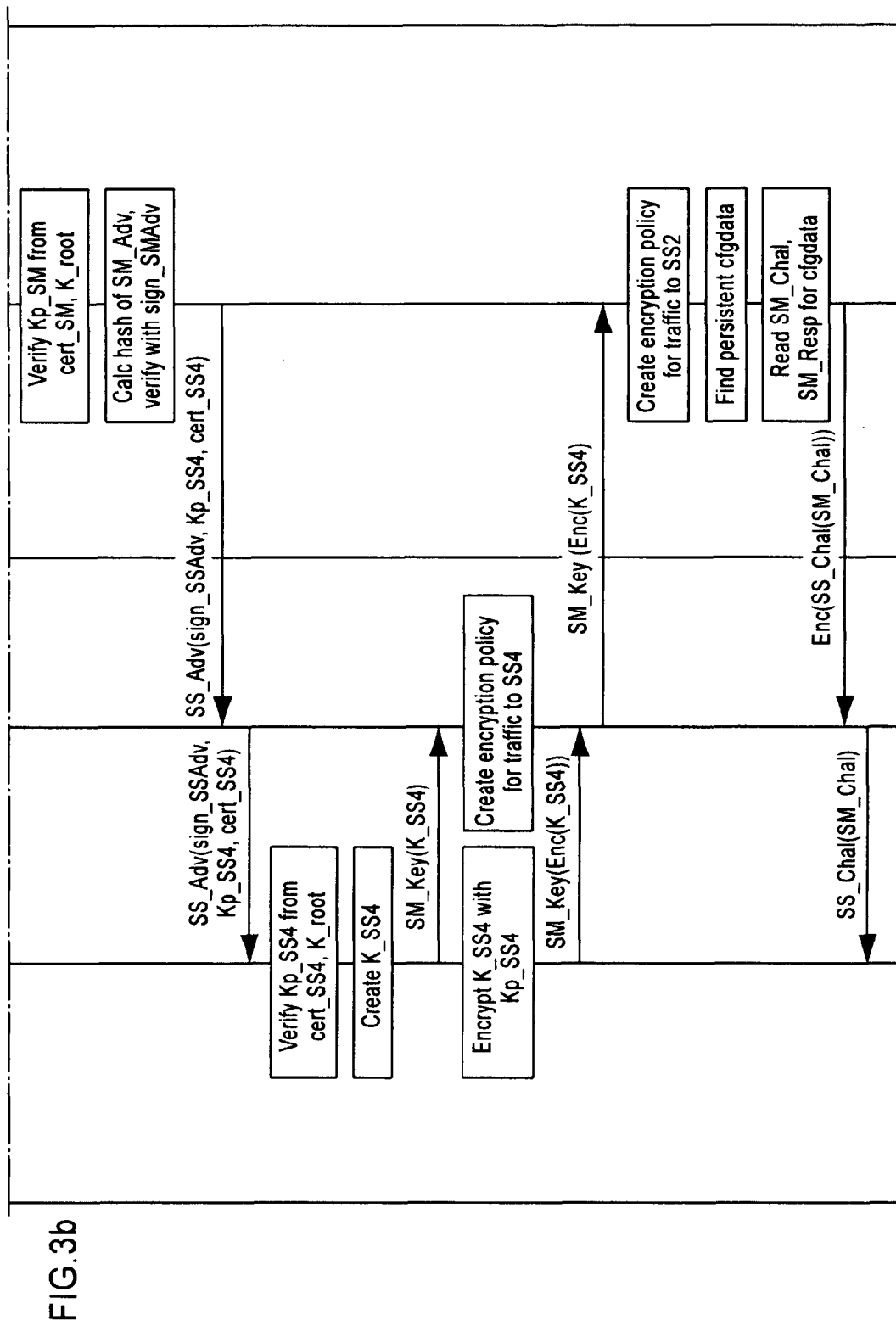
Figure 3C:
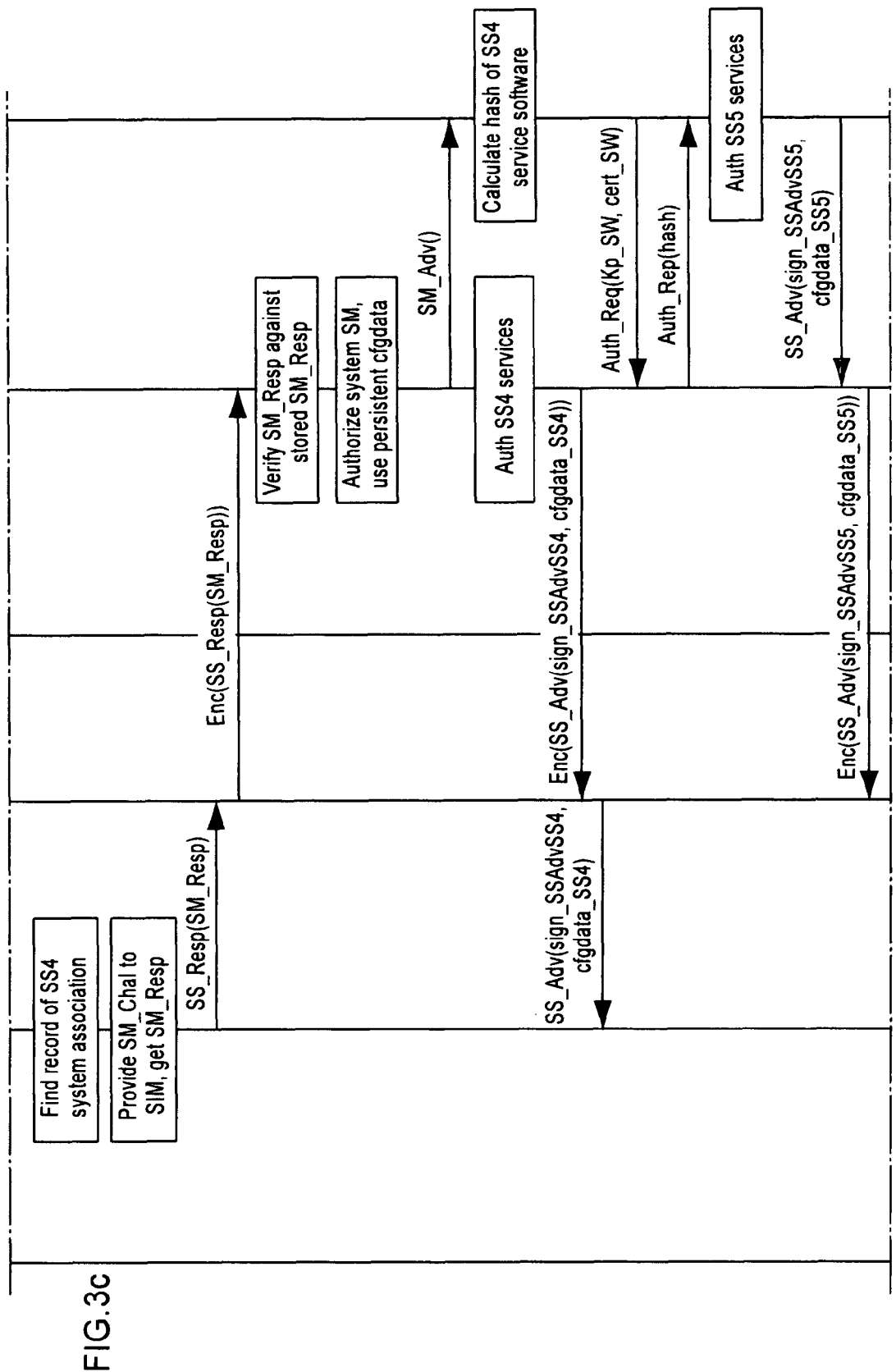

As shown in FIG. 3, while the Connectivity Subsystem 1, the Application Subsystem 2, and the Internal Storage Subsystem 3 are co-authenticating, the Imaging Subsystem 4 and the Input Subsystem 5 can start co-authenticating. First, the subsystems may power up and determine whether their links are trusted or untrusted. The subsystems can then calculate the hashes of their own software. Next the Imaging Subsystem 4 can calculate the hashes of the combination of its certificates plus its public key, and compare the results with the hash of the software.

The Input Subsystem 5 can then send an authorization request including a public key and a certificate to the Imaging Subsystem 4. The Imaging Subsystem 4 can then calculate the hashes of the Input Subsystem 5 from the certificate plus the public key. The Imaging Subsystem 4 can than provide an Authorization Response to the Input Subsystem 5 including the hashes. The Input Subsystem 5 can then compare the hashes and authorize its software.

The Connectivity Subsystem 1 can create and sign an SM Advertisement message. The SS1 can send the signed SM Advertisement message including the SM public key and certificate to the SS2. The SS2 can then relay the SM Advertisement message to the SS4. The SS4 can then verify the SM Public key from SM certificate plus the root key. The SS4 can next calculate a hash of the SM Advertisement message and verify with a signed SS Advertisement message. The SS4 can then send the SS Advertisement message including the public key and certificate of the SS4 to the SS2, which can relay the message to the SS1.

The SS1 can verify the public key of the SS4 using the certificate of the SS4 and the root key. The SS1 can then create a key for the SS4. The SS1 can then send the key for the SS4 to the SS2. The SS2 can create an encryption policy for traffic to the SS4 in view of the key and the nature of the link the SS4 as trusted or untrusted.

Meanwhile, the SS1 can encrypt the key for the SS4 with the public key of the SS4. The SS1 can transmit the encrypted key for the SS4 to the SS2, which can relay the key unencrypted to the SS4. The SS4 can receive the encrypted key and create an encryption policy for traffic to the SS2. The SS4 can find its persistent configuration data and read the SM challenge and SM response for the configuration data. The SS4 can send an encrypted SS challenge containing the SM challenge to the SS2, which can relay the SS challenge to the SS1. The SS1 can find a record of the system association for the SS4. The SS1 can then provide an SM challenge to the SIM and get an SM response.

The SS1 can then send the SS Response enclosing the SM Response to the SS2, which can encrypt and relay the SS Response to the SS4. The SS4 can verify the SM response against the stored SM response. If the comparison is favorable, the SS4 can authorize the system SM and use the persistent configuration data. The SS4 can then send an SM Advertisement message to the SS5. The SS5 can calculate a hash of the service software of the SS4.

Meanwhile the SS4 can authorize its services. The SS4 can then send an encrypted signed SS advertisement message including its configuration data to the SS2. The SS2 can forward the SS advertisement unencrypted to the SS1.

The SS5 can then send an authorization request including the public key and certificate of its software to the SS4. The SS4 can respond with an authorization response including a hash. The SS5 can than authorize its services. The SS5 can subsequently send a signed SS advertisement message including its configuration data to the SS4. The SS4 can encrypt and relay the signed SS advertisement message to the SS2, which can relay the signed SS advertisement unencrypted to the SS1. The SS1 can then create SS and service routing tables.

Next, the SS1 can send RM configuration data for the SS4 to the SS2. The SS2 can encrypt the RM configuration data and send it to the SS4. At this point the SS4 can be operational, and the SS1 can send RM configuration data for the SS5 to the SS2. The SS2 can encrypt the RM configuration data and send it to the SS4, which can relay it unencrypted to the SS5. At this point the SS5 can be operational.

Figure 4A:
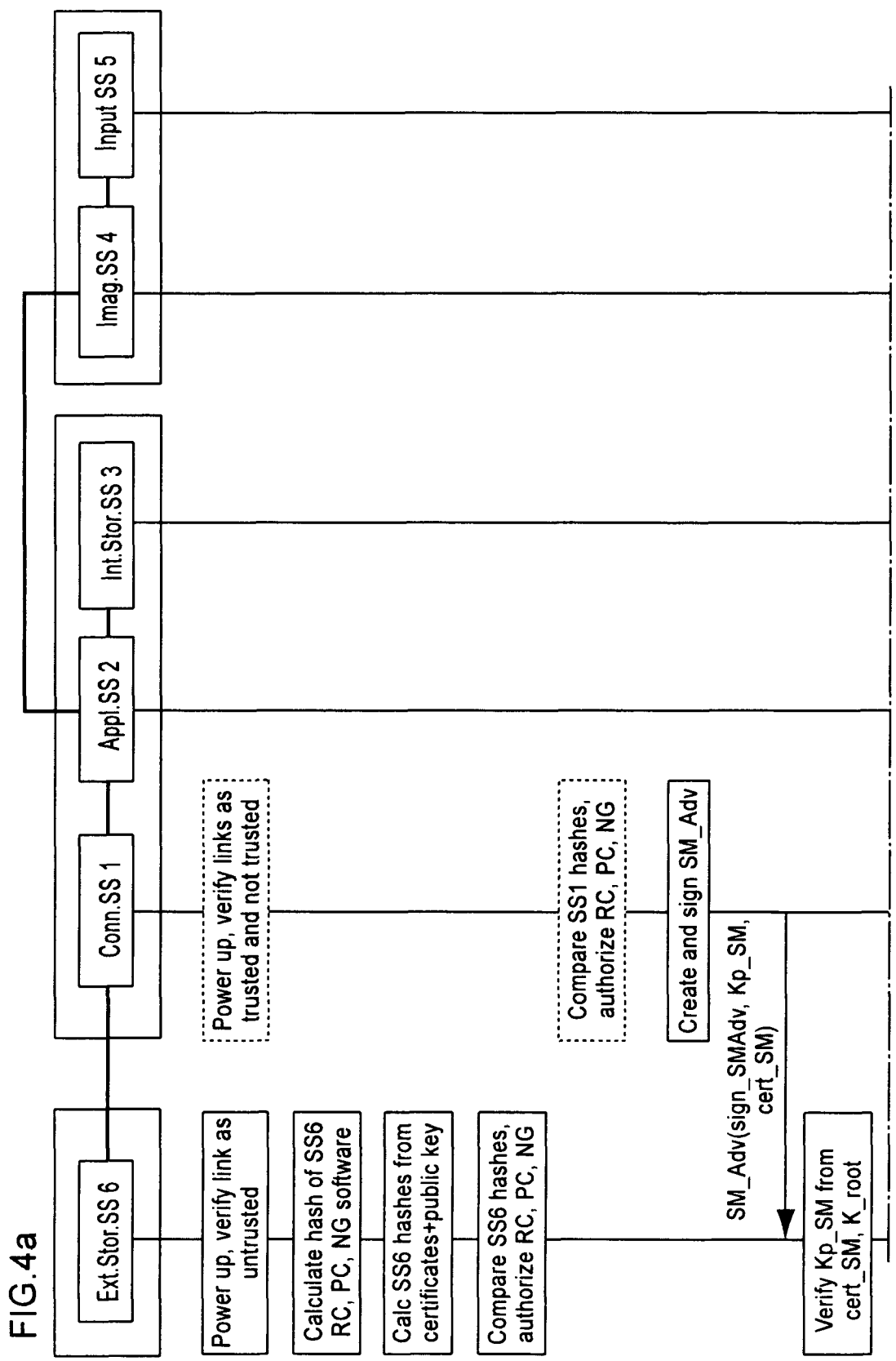
FIG. 4 depicts a communication schema during the boot phase of operation amongst the various sub-systems of an example distributed device.
Figure 4B:
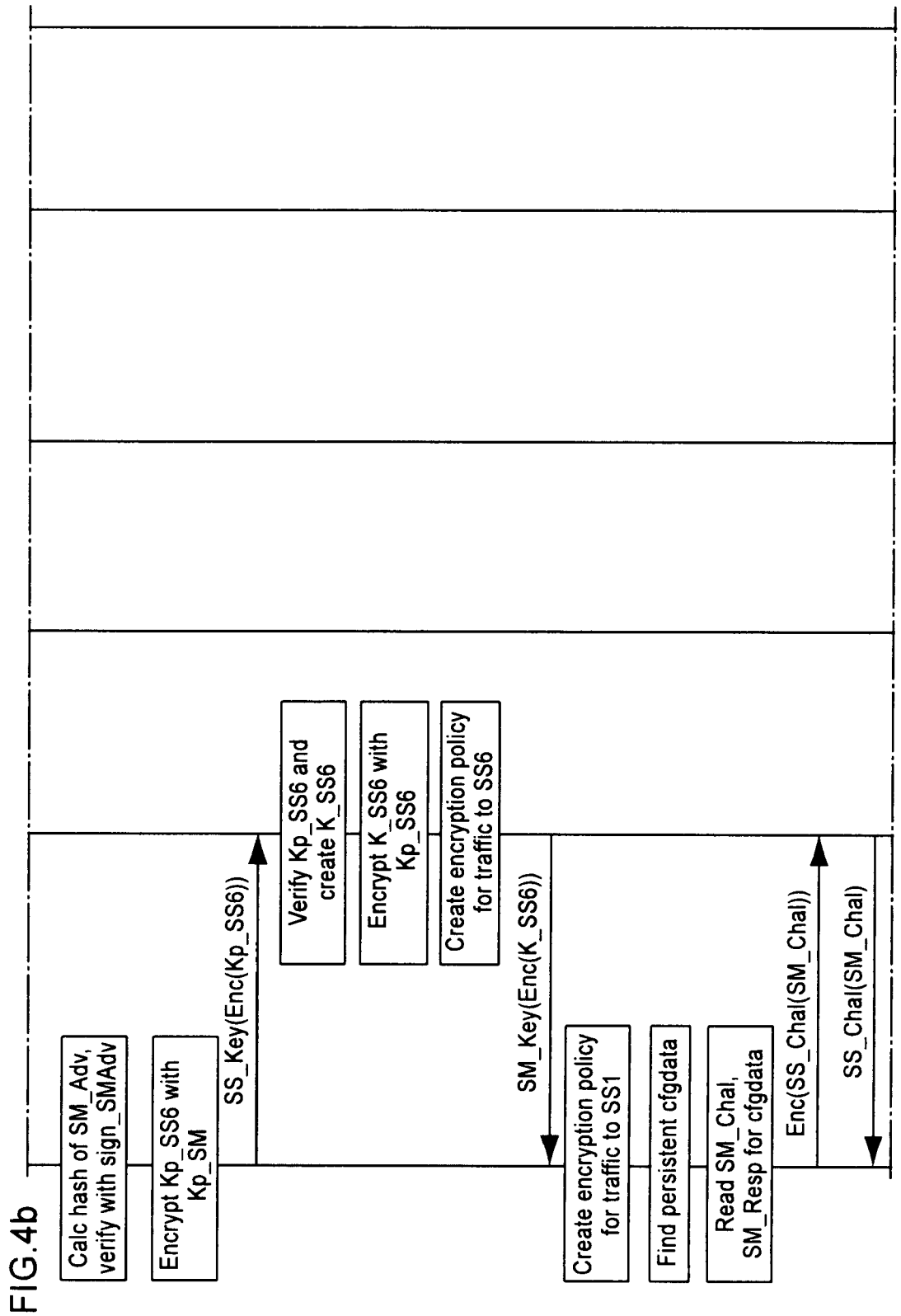

FIG. 4 shows how the External Storage Subsystem 6 can become operational. The SS1 can go through power up and verification of links as trusted and untrusted. The SS1 can also verify its software by calculating hashes.

Meanwhile the SS6 can calculate a hash of its own software. The SS6 can than calculate hashes from its certificates plus its public key. The SS6 can next compare the hashes and, if the comparison is favorable, authorize its own software.

After authorizing its software, the SS1 can create and sign an SM advertisement. The SS1 can send the signed SM advertisement message including the SM public key and SM certificate to the SS6. The SS6 can verify the SM public key from the SM certificate and the root key. The SS6 can next calculate a hash of the SM advertisement message and verify with the signed SM advertisement. The SS6 can then encrypt its own public key with the SM public key, and transmit the encrypted key to the SS1.

The SS1 can then verify the SS6 public key and create a key for the SS6. The SS1 can encrypt the key for the SS6 with the SS6 public key. The SS1 can then create an encryption policy for traffic to the SS6. The SS1 can than transmit the SM key with an encrypted copy of the key for the SS6.

The SS6 can then create an encryption policy for the SS1. Next, the SS6 can find its persistent configuration data, and read the SM challenge and SM response contained therein. The SS6 can than send an encrypted SS challenge including the SM challenge to the SS1. The SS1 can respond with the unencrypted SS challenge including the SM Challenge. The SS1 can also find a record of the system association for the SS6. The SS1 can then provide the SM challenge to the SIM and receive the SM response from the SIM. The SS1 can send the received SM response in an encrypted SS response to the SS6.

The SS6 can verify the SM response against the stored SM response. The SS6 can authorize the system SM and use the persistent configuration data. Then the SS6 can authorize its own services. The SS6 can send a signed encrypted SS advertisement message including its configuration data to the SS1. The SS1 can then create SS and service routing tables. The SS1 can then send encrypted RM configuration data to the SS6. The SS6 can then be operational.

Figure 5:
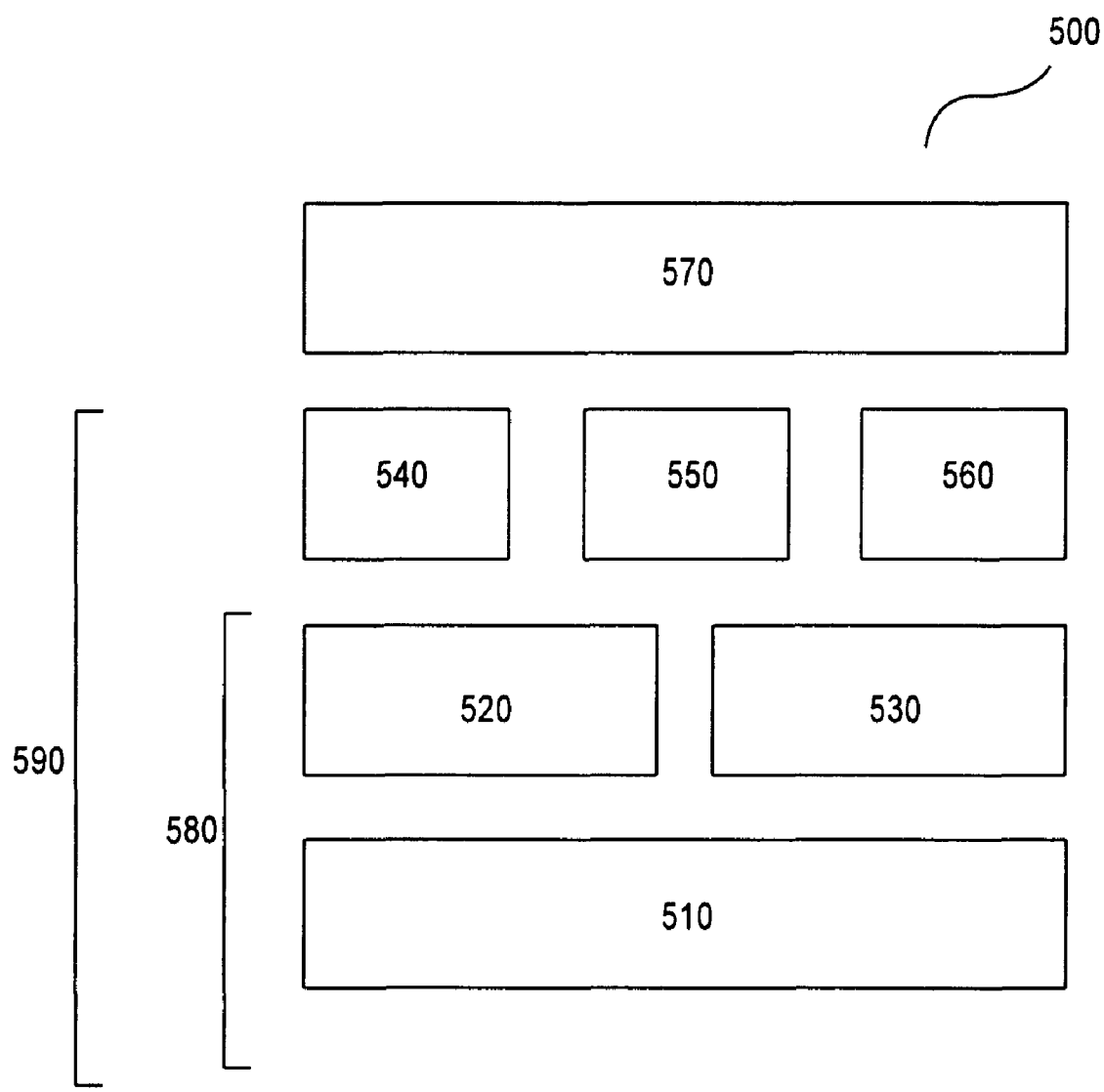
FIG. 5 depicts a generalized overview of secure bootstrapping in a monolithic system.

FIG. 5 illustrates securely bootstrapped monolithic system 500. The monolithic system 500 may be built up from a trusted hardware base 510. The trusted hardware base 500 may include boot protection, secure execution, and trusted hardware services. Components of the trusted hardware base 500 may include cryptographic algorithms, random number generators, and system monitoring components. On the trusted hardware base 500, a layer of secure storage 520 and software authentication and authorization 530 may be added. This layer of security may include as components software certificate storage, integrity checking, and other authorization components. Together with the trusted hardware base 500, this layer may form the trusted computing base 580. On the trusted computed base 580, another layer of security may be added, including trusted applications for trusted user interaction 540, incident countermeasures 550, and attestation 560. These trusted applications together with the trusted computing base may make up the basic platform security 590. In addition to the basic platform security 590, the monolithic system may include additional security software 570 including communications (protocol) security, content security, and third part security applications. This additional security software may serve as additional outside the system platform but may contribute to the security of the platform.

Figure 6:
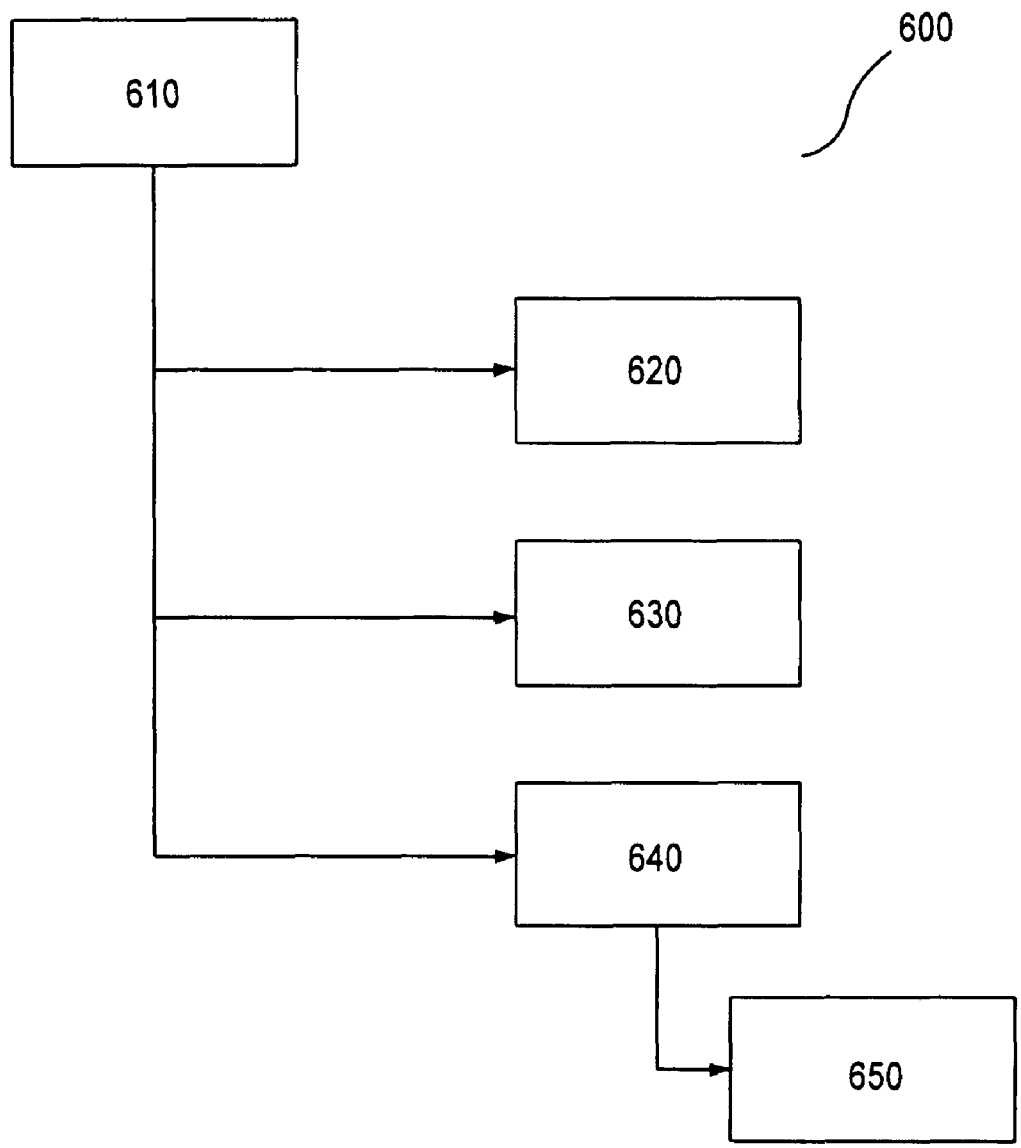
FIG. 6 depicts a flow chart of a trust chain with PKI certificate.

FIG. 6 provides a trust chain 600 for use with PKI certificates. The trust chain 600 may begin with vendor public certificate 610, which may be assumed to be trustworthy. In general certificates may be used to hash content into signatures, and to protect with public key cryptography. The vendor public certificate 610 may be permanently stored in the device. For an identified device, is it may serve as the root of the trust chain. On this root, software certificates, for example, software A certificate 620 and software B certificate 630 may be built. In practice, such software certificates may be provided with the code, which the device may store and check the certificate before executing the code. Another way a software certificate can come to be trusted is via an integrator X certificate 640. The integrator X certificate 640 can then provide a trust basis for a software C certificate 650.

Figure 7:
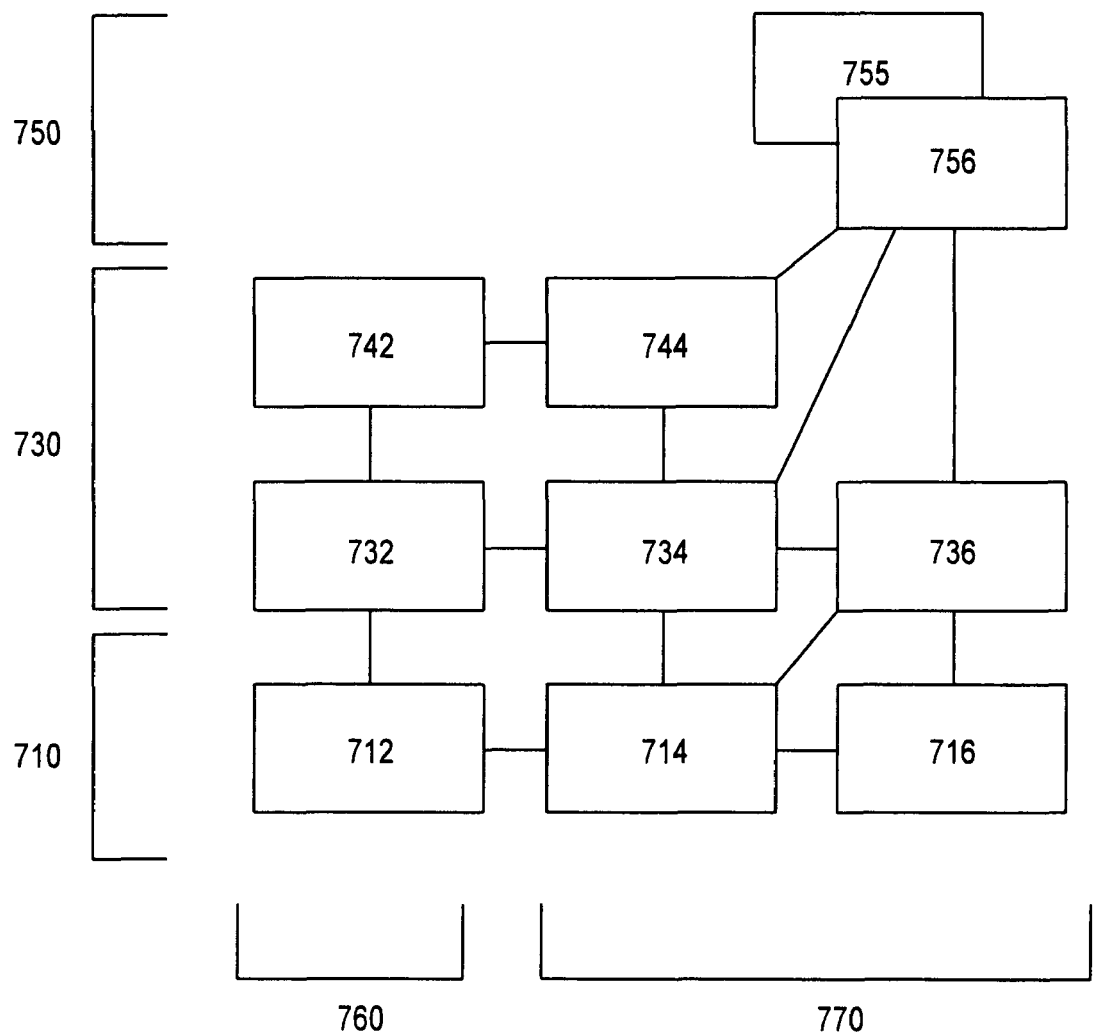
FIG. 7 depicts the functional architecture of an example embodiment of the present invention.

FIG. 7 illustrates a functional architecture for an embodiment of the present invention. As illustrated, a boot process can occur beginning with a first boot phase 710, moving to a second boot phase 730, and finishing with a third boot phase 750. In the first boot phase 710, the security manager 712, the security controller 714, and the link controller 716 may boot. In the second boot phase 730, the resource manager 732, the resource controller 734, the network gateway 736, the power/energy manager 742, and the power controller 744 may boot. Finally, in the third stage various services 756 and associated application 755 may boot. In general the system level 760 components may include the security manager 712, the resource manager 732, and the power/energy manager 742. The subsystem level 770 components may include the security controller 714, the link controller 716, the resource controller 734, the network gateway 736, the power controller 744, and the various services 756. The applications 755 may be performed by the subsystem level components and therefore may be classified within the subsystem level 770.

An example of one embodiment of the present invention includes the following aspects: specific initial configuration information is written securely to the subsystem by the device manufacturer that assembles the system; a trusted execution, networking and computation part is located within each subsystem, protected against runtime and other analysis by outside tools; verification of software integrity and authorization of the software for subsequent execution is performed during boot; a secure connection to the RM is established; and system wide configuration information, including routing tables for subsystem and service connectivity are provided. Each of these aspects is discussed in more detail, below.

Specific initial configuration information can be written securely to the subsystem by the device manufacturer or assembler of the system. This may include various kinds of information. Subsystem identity information, for example, can be included in the certificates. The subsystem itself can have a unique ID. Optionally, a list of subsystem IDs that are known to be part of the system can be included.

The information can also include system topology information as attributes of each subsystem interconnect interface. Attributes can include protection level: trusted or untrusted. A subsystem or connection that is on-chip may, for example, be a trusted subsystem or connection and an external subsystem or connection may, for example, be an untrusted subsystem. Attributes can also include topology such as normal, stub, or bridge. Attributes can further include connectibility: static or pluggable. Attributes can also optionally include an indication of direction such as an indication of interface towards RM, or towards a service, using, for example, routing table.

If a subsystem is pluggable or does not support the standard physical interconnect—using instead, for example, some legacy system bus or a proprietary interface—the link can be described as untrusted and should be connected as a stub in order to restrict the potential threat consequences to that particular subsystem.

SS, software certificates, and key material for use in authorization of detected system configuration, or for protection of intra-system communication, can be implemented. The keys can also be in the form of seed values for dynamically generating a sequence of keys. A minimum authorization tool set can include a root certificate. Certificates can be used for subsystem's own contents. Typically, however, this would not include service software certificates. Certificates can also be used for the system's resource manager (RM) including a specific RM, or a list of candidate RMs. Certificates can also optionally be used for peer subsystems of the system.

Specific initial configuration information can also include an indication of whether the subsystem contents are configurable, including, for example, content used during the boot phases, or service software running on the subsystem.

A trusted execution, networking and computation part can be included within each subsystem, protected against runtime and other analysis by outside tools. This would typically be a functional block that would provide several functions.

The functional block can include interconnect state detection and link setup. This function can include detecting changes in the interconnected subsystem, such as hot-plugging. Replacement of a subsystem during reboot while there is no power may be undetectable without some auxiliary battery power. This function also can include a subsystem detecting whether there is a peer subsystem connected to a link or interconnect.

The functional block can also include protocol for the exchange and processing of boot messages over the interfaces. The behaviors of regular subsystem and RM can be different. The default assumption can be that the interconnect links are of dual simplex point-to-point type. The protocol can allow encryption and decryption of at least system control and optionally other messages transmitted over untrusted links. There is usually no need to encrypt messages over trusted links. The protocol may also provide an interface for SC and SM via the Link Controller (LC) over the interconnect link. More details regarding a suitable protocol are discussed below.

The functional block can also include cryptographic functions and resources. These resources may include a random number generator, a hash algorithm, and secure memory. Some subsystems may include shared key and public key cryptographic algorithms. In general, there should be at least one subsystem with such capability for every set of subsystems separated from the RM by one or more external links. The subsystem without these algorithms can use them via protocol from an authorized subsystem, such as RM, that has them, as will be discussed in more detail below. A subsystem that bridges system subnets may need to encrypt system control messages, and therefore should have these algorithms for better system performance.

Verification of software integrity and authorization of the software for subsequent execution can be performed. This may take place in the subsystem itself, or in a securely reachable peer subsystem. The component performing verification and authorization can be referred to as the Security Controller (SC) or the Security Manager (SM). Each subsystem can be designed to be capable of calculating the hashes of its system control components that are used during the boot process. Additionally, some subsystems can be capable of authorizing the hashes by comparing them to those calculated from the stored certificates. An SM should always this capability. A subsystem that cannot do the calculation may be able to request that as a service provided by a peer subsystem over a trusted link.

Establishing of a secure connection to the RM can be another part of the boot process. Securely reachable subsystems, such as those with only trusted links and peers between them and the RM, can forward messages without additional protection. Other subsystems can use an intermediate subsystem that needs to set up an encrypted tunnel though a security association (SA) to the RM, as will be discussed in more detail below.

System wide configuration information, including routing tables for subsystem and service connectivity can be implemented. Thus, any unauthorized configuration can be rejected. The subsystems can send their local configuration to a central authority (RM) as soft state configuration information. The RM can aggregate such configuration information and then send the aggregate to subsystems as routing tables. This information should not persist across system reboots. Optionally, configuration that is cryptographically verified and authorized by the RM to have been created by itself can be transferred across reboots in order to speed up the boot. Such persistent initial configuration can be stored in the subsystem and can be used after authorization by the security domain and/or end user specific identity module, for example an evolved SIM, potentially contained in the RM, as is discussed in more detail below.

Each subsystem, and/or the complete system, can have two main states during the boot process.

A first state is one in which secure subsystem connectivity has been established, meaning that the subsystem can be used as a service platform within the system topology. The subsystem can reach this state either as a result of trusted system configuration stored in the subsystem during manufacturing, or after initial key exchange with the RM, including authentication. This can be achieved after secure connectivity has been established over unsecured links as discussed in more detail below.

A second state is one in which connectivity, for services and messages, has been established. The system can reach this state either as a result of trusted system configuration stored in all subsystems during manufacturing, successful authorization of identified manufacturer certified subsystems with trusted remote attestation or trusted subsystem reports to RM, or unilateral authentication of RM by an subsystem produced by an independent vendor. This can be achieved after creation of system routing tables for subsystem and service connectivity as discussed in more detail below.

Figure 8:
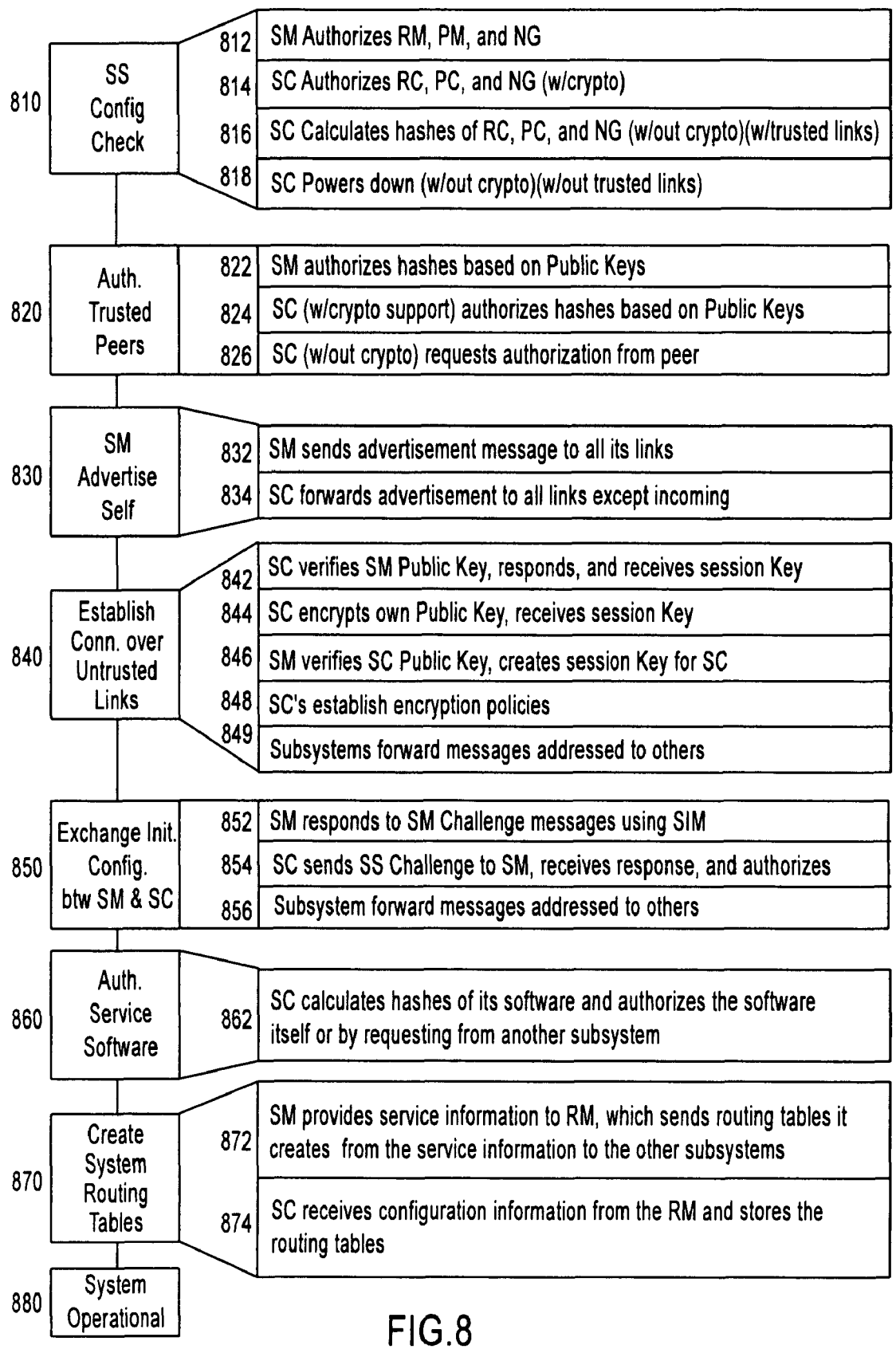
FIG. 8 depicts a process flow.

The protocol used during the boot phases described in this invention can be made up of system control message exchanges initiated by the secure component within the subsystems (SM or SC). An example of the flow of steps is illustrated in FIG. 8.

After power-up each subsystem checks 810 its secure initial configuration. The Security Manager (SM), which may always have crypto support, authorizes 812 the resource manager (RM), power manager (PM), and network gateway (NG) components in the subsystem. Any Security controller (SC) with crypto support authorizes 814 the resource controller (RC), power controller (PC), and NG components in the subsystem. Any SC without crypto support but with one or more trusted link calculates 816 hashes of RC, PC and NG components in the subsystem. Any SC without crypto support or trusted links powers down 818 the subsystem. This situation may arise if the subsystem has been incorrectly attached to the system.

Next, peer subsystem system components may be authorized 820 over trusted links. The SM receives Auth_Req, authorizes 822 the hashes based on public keys and responds to the originator with reply Auth_Rep. Any SC with crypto support authorizes 824 similar to the SM. Any SC without crypto support sends a request 826 Auth_Req to trusted peer subsystem to authorize them, waits until it receives a reply Auth_Rep, and then authorizes the RC, PC and NG components in the subsystem. If such SC receives Auth_Req message from other trusted links, it creates a temporary session state for subsequently forwarding Auth_Rep message back, and forwards both messages.

The SM can advertise 830 itself. The SM sends 832 an SM_Adv message to all its links, both trusted and untrusted. Any SC forwards 834 a received SM_Adv to all other links than the one from which it was received, and creates a route towards the SM.

Secure connectivity can be established 840 over untrusted links. After receiving SM_Adv over an untrusted link, any SC verifies 842 the public key of the SM. If the subsystem has a public key known to the SM, it sends the key in a reply message SS_Adv. The SC waits for response SM_Key with the session key. This kind of subsystem is authenticated by the SM. If the subsystem received SM_Adv over an untrusted link but has no public key known to the SM, the subsystem uses it to encrypt 844 its own public key and sends this in a reply message SS_Key. The SC waits for response SM_Key with the session key. This kind of subsystem is viewed as only unilaterally authenticated. The link can be protected but the SM may be unable to authenticate the subsystem on the opposite side of the link.

The SM receives SS_Adv or SS_Key, verifies the public key of the subsystem and creates 846 a session key with that subsystem. It sends the key in the clear in SM_Key message to the subsystem on the SM side of the untrusted link, and sends the key encrypted with the public key of the SC in SM_Key message to the subsystem on the opposite side of the untrusted link. The SCs on both sides of the untrusted link set up 848 policies to encrypt/decrypt all subsequent system control messages on the link, providing confidentiality and authentication to such traffic. If receiving an SS_Adv or SM_Key not addressed to itself, any subsystem forwards 849 the message.

Initial configuration exchange can occur 850 between SM and SC. The SM receives SM_Chal messages, finds the association in its persistent configuration data and provides the SM_Chal to its user-specific identity module such as an evolved SIM. It then receives the response from the identity module and sends 852 it in message SS_Resp back to the SC. The SC checks if it has persistent configuration data created before the latest power-up. If found, such data can contain a challenge-response pair created by the previous SM. SC sends 854 the challenge in SS_Chal message towards SM. SC receives SS_Resp from SM and authorizes SM. If receiving an SS_Chal or SS_Resp not addressed to itself, a subsystem forwards 856 the message.

Service software can also be authorized 860. The SC can calculate hashes of the service software in the subsystem and authorize 862 these by itself, or using the Auth_Req and Auth_Rep exchange described in step 2. It then can send this service information to SM in message SS_Adv.

System routing tables can be created 870 for subsystem and service connectivity. The SM receives service information in SS_Adv messages and provides them to RM, which associates these with the unique subsystem identifiers that are used as addresses directly, or when creating unique addresses more fitting to the system topology. The RM sends 872 the resulting routing tables back to subsystems in RM_Cfg messages. The SC receives RM_Cfg message and stores 874 the routing tables. After this the subsystems and their services in the system are connected and the system is operational 880.

The following are some example algorithms for implementing certain embodiments of the present invention. In the following, Hash(X), Encrypt(y,X) and Decrypt(y,X) denote a cryptographic transform of content X, using key y in the case of Encrypt and Decrypt functions. Auth_req(a,b,c), Auth_rep(a,b), SM_Adv(a,b,c,d), SS_key(a,b) and SM_key(a) denote messages containing one or more of information elements a,b,c and d, as well as additional fields required by the protocol.

Algorithm A: Authorization of RC, PC, SG and the like system components (SW) in peer subsystem: first, source subsystem sends calculated hash: Auth_Req(SSID_Req, Kpub, Encrypt(Kpri, Hash(SW))); second, peer subsystem resolves certificate: Decrypt(Kpub, Encrypt(Kpri, Hash (SW)))=Hash(SW); third, peer subsystem returns certified hash: Auth_Rep(SSID_Req, Hash(SW)); and fourth, source subsystem compares hashes (verification): Hash(SW)_calculated=Hash(SW)_certificate.

Algorithm B: Creation of session key by SM for untrusted link boundary SCs as in steps 4*b*/4*c* (Kpri_Vendor and Kpub_Vendor are used for vendor/manufacturer certification of the SM; cfgdata indicates that certain messages may contain some system configuration information if necessary):

1. SM creates advertisement body: SM_Adv'
2. SM signs advertisement: Encrypt(Kpri_SM, Hash(SM_Adv'))
3. SM sends complete signed advertisement:
   SM_Adv(Encrypt(Kpri_SM, Hash(SM_Adv'), Kpub_SM, Encrypt(Kpri_Vendor, Kpub_SM), cfgdata)
4. SC resolves SM key using vendor certificate: Decrypt(Kpub_Vendor, Encrypt(Kpri_Vendor, Kpub_SM))=Kpub_SM
5. SC compares SM keys (verification): Kpub_SM_SMAdv=Kpub_SM_cert
6. SC calculates message signature: Decrypt(Kpub_SM, Encrypt(Kpri_SM, Hash(SM_Adv')))=Hash(SM_Adv')
7. SC compares message signatures (verification): Hash(SM_Adv')_calculated=Hash(SM_Adv')_certificate
8. SC creates its own public key pair: (Kpri_SS, Kpub_SS)
9. SC encrypts its public key with SM's key: Encrypt(Kpub_SM, Kpub_SS)
10. SC sends its public key to SM: SS_Key(Encrypt(Kpub_SM, Kpub_SS), cfgdata)
11. SM decrypts subsystem's public key: Decrypt(Kpri_SM, Encrypt(Kpub_SM, Kpub_SS))=Kpub_SS
12. SM creates session key for that subsystem: Ksec
13. SM encrypts the session key with subsystem's public key: Encrypt(Kpub_SS, Ksec)
14. SM sends the session key to subsystem with SM_Key (Encrypt(Kpub_SS, Ksec)) and activates in/outbound SA between SC and SM with Ksec
15. SC decrypts the message to get the session key: Decrypt(Kpri_SS, Encrypt(Kpub_SS, Ksec))=Ksec
16. SC activates in/outbound SA between SC and SM with Ksec.

Algorithm C: Authorization of membership of SM in a security domain or ownership of SM by an end user: first, subsystem selects configuration data to be applied, or chooses to establish a new subsystem-SM association, which describes the system into which the subsystem has been connected; second, subsystem sends the challenge to SM, where the challenge was contained in stored subsystem-SM association, or was newly generated; third SM forwards the challenge to an identity module such as an evolved SIM; fourth, SM receives response from the identity module and sends it to subsystem, and fifth, subsystem compares response to previously stored value associated with the configuration data, or stores response to a newly generated challenge in order to later authorize the current subsystem-SM association.

The above describes an example default embodiment of the present invention. In alternative embodiments some parts may be simplified. For example, the SM may not include an identity module such as an evolved SIM, not all subsystems may have crypto support; persistent configuration data may be omitted; all subsystems may have public keys; subsystem-SM session key material may be included as initial configuration data; or only part of the process up to secure subsystem-SM connectivity may be performed and service registrations may be omitted. The messaging and application of encryption or decryption can be performed by LC under the control of SC.

The present invention thus can permit a subsystem to be connected to different systems, under the assumption that there is only one authoritative SM for the system. The invention allows for one subsystem to be powered up later than the others, as long as the intermediate subsystems between it and the SM are powered up. In other words subsystems can be securely appended to a secured system after power up.

Accordingly, an embodiment of the present invention may advantageously secure intra-unit distribution and modularization of services. Certain embodiments of the present invention, therefore, can support very simple subsystems with very limited processing capabilities, without requiring complicated cryptographic functions of them. Additionally, the present invention can verify that a subsystem is completely trusted, rather than having to rely on reputation based solutions. Furthermore the subsystems need not share common key material or certificates, which would tend to make remote attestation and hacking more difficult. It is to be noted that the present invention could be applied to mobile terminals in a wireless network, but there is no specific requirement that it be so implemented.

It is noted that the present invention is not restricted to the above preferred embodiments but can be variously modified as would be apparent to one of ordinary skill in the art.

What is claimed is:

1. A method comprising:
   providing a public key infrastructure key to each of a plurality of subsystems of a modular device;
   providing a hashing mechanism to each of the plurality of subsystems of the modular device; and
   verifying, by the plurality of subsystems of the modular device, the authenticity of the plurality of subsystems during boot-up using the public key infrastructure key and the hashing mechanism, wherein the plurality of subsystems of the modular device comprise a connectivity subsystem, an application subsystem, and an internal storage subsystem, and wherein the connectivity subsystem, the application subsystem, and the internal storage subsystem are internal to the modular device, wherein the connectivity subsystem comprises a single security manager configured to authorize the plurality of subsystems and configured to send at least one of a plurality of advertisement messages for authorizing at least one of the plurality of subsystems, an application subsystem configured to forward the at least one of a plurality of advertisement messages to another of the plurality of subsystems, and an internal storage subsystem configured to receive the forwarded at least one of the plurality of advertisement messages, wherein the plurality of advertisement messages include a public key and a certificate.

2. The method of claim 1, wherein, after the verifying of the authenticity of the plurality of subsystems of the modular device, at least one subsystem external to the plurality of subsystems of the modular device are verified during the boot-up.

3. The method of claim 1, wherein the verifying the authenticity of the plurality of systems comprises:
   sending from a management subsystem of the plurality of subsystems a first signed advertisement message to a non-management subsystem of the plurality of subsystems, soliciting authentication;

receiving by the management subsystem a challenge message from the non-management subsystem, in response to the first signed advertisement message;

responding by the management subsystem to the challenge message with a challenge response message;

receiving by the management subsystem a second signed advertisement message from the non-management subsystem, in response to the challenge message; and providing by the management subsystem configuration data to the non-management subsystem, in response to the second signed advertisement message.

4. The method of claim 3, wherein the first advertisement is restricted to communication channels that are deemed secure.

5. The method of claim 1, wherein the providing the public key infrastructure key is performed during a manufacturing process.

6. The method of claim 1, wherein the providing the hashing mechanism is performed during a manufacturing process.

7. An apparatus comprising:
at least one processor; and
at least one memory including code which when executed by the at least one processor provides at least:
a management module comprising a single security manager configured to authorize a plurality of subsystems and configured to send at least one of a plurality of advertisement messages to authorize at least one of the plurality of subsystems; and
a first non-management module coupled to the management module, wherein the first non-management module comprises an application subsystem configured to forward the at least one of a plurality of advertisement messages;
a second non-management module coupled to the first management module, wherein the second management module comprises an internal storage subsystem and is configured to receive the forwarded at least one of a plurality of advertisement messages;
wherein the management module, the first non-management module, and the second non-management module each comprise a public key infrastructure key and a hashing mechanism,
wherein the management module, the first non-management module, and the second non-management module are configured to verify one another's authenticity.

8. The apparatus of claim 7, wherein the management module is configured to initiate authentication by communicating a first advertisement message to the first non-management module.

9. The apparatus of claim 8, wherein the first non-management module is configured to respond to the first advertisement message with a challenge message.

10. The apparatus of claim 9, wherein the management module is configured to respond to the challenge message with a challenge response message.

11. The apparatus of claim 10, wherein the first non-management module is configured to respond to the challenge response with a second advertisement message.

12. The apparatus of claim 11, wherein the management module is configured to respond to the second signed advertisement message with configuration information.

13. A method comprising:
identifying, by a single security manager, whether links to a subsystem of a secure device are trusted or untrusted, wherein the single security manager is configured to authorize other subsystems and configured to send at least one of a plurality of advertisement messages to authorize the other subsystems; and calculating a first hash of a software of the subsystem;
calculating a second hash from a certificate and a public key;
comparing the first hash and the second hash, and if the hash indicates that the software and the certificate are authentic, authorizing the software and the certificate; and
authenticating, by the single security manager, the other subsystems of the secure device, wherein each of the subsystems include a public key infrastructure key and a hashing mechanism to enable the authenticating, wherein the authenticating comprises:
providing a signed security manager advertisement message,
awaiting a responsive subsystem challenge message, providing a subsystem response message in response to the subsystem challenge message,
awaiting an appropriately signed subsystem advertisement message, and providing resource manager configuration information to the other subsystems.

14. The method of claim 13, further comprising applying encryption to communications of the subsystem if the communications take place over an insecure link.

15. The method of claim 14, wherein a link is deemed insecure if it was identified as an untrusted link.

16. A method comprising:
authorizing, by a management module comprising a single security manager, a plurality of subsystems;
sending, by the management module, at least one of a plurality of advertisement messages to authorize at least one of the plurality of subsystems;
forwarding, by a first non-management module coupled to the management module, at least one of a plurality of advertisement messages, wherein the first non-management module comprises an application subsystem;
receiving, at a second non-management module coupled to the first management module, the forwarded at least one of a plurality of advertisement messages, wherein the second management module comprises an internal storage subsystem;
wherein the management module, the first non-management module, and the second non-management module each comprise a public key infrastructure key and a hashing mechanism,
wherein the management module, the first non-management module, and the second non-management module are configured to verify one another's authenticity.

17. The method of claim 16, wherein the management module is configured to initiate authentication by communicating a first advertisement message to the first non-management module.

18. The method of claim 17, wherein the first non-management module is configured to respond to the first advertisement message with a challenge message.

19. An apparatus comprising: a single security manager configured to identify whether links to a subsystem of a secure device are trusted or untrusted, wherein the single security manager is configured to authorize other subsystems and configured to send at least one of a plurality of advertisement messages to authorize the other subsystems, wherein the single security manager is further configured to calculate a first hash of a software of the subsystem, calculate a second hash from a certificate and a public key, compare the first hash and the second hash, and if the hash indicates that the software and the certificate are authentic, and authorize the software and the certificate, wherein the single security manager is further configured to authenticate the other subsystems of the secure device, wherein each of the subsystems include a public key infrastructure key and a hashing mechanism to enable the authenticating, wherein the authenticating comprises:

providing a signed security manager advertisement message, awaiting a responsive subsystem challenge message, providing a subsystem response message in response to the subsystem challenge message, awaiting an appropriately signed subsystem advertisement message, and providing resource manager configuration information to the other subsystems.

20. The apparatus of claim 19, further comprising applying encryption to communications of the subsystem if the communications take place over an insecure link.

21. The apparatus of claim 20, wherein a link is deemed insecure if it was identified as an untrusted link.

* * * * *